United States Patent [19]
Solterbeck

[11] 3,885,375
[45] May 27, 1975

[54] TRACTOR MOUNTED CORN HARVESTER

[75] Inventor: Ward W. Solterbeck, Payette, Idaho

[73] Assignee: American Fine Foods, Inc., Payette, Ind.

[22] Filed: Oct. 23, 1973

[21] Appl. No.: 408,176

[52] U.S. Cl. ............ 56/15.6; 56/14.2; 56/DIG. 9; 56/DIG. 11; 56/105; 56/106; 56/12.8; 56/11.9
[51] Int. Cl. .......................................... A01d 35/12
[58] Field of Search ............ 56/14.2, 103, 104, 105, 56/106, 119, 15.6, 10.9, 15.9, 12.8, 13.3, DIG. 9, DIG. 11

[56] References Cited
UNITED STATES PATENTS

| | | | |
|---|---|---|---|
| 2,347,871 | 5/1944 | Andrews et al. | 56/106 |
| 2,488,698 | 11/1944 | Action | 56/15.6 |
| 3,101,579 | 8/1963 | Karlsson | 56/105 |
| 3,174,266 | 3/1965 | Hoeksema | 56/106 |
| 3,641,747 | 2/1972 | Bobard | 56/15.6 |

Primary Examiner—Louis G. Mancene
Assistant Examiner—James D. Hamilton
Attorney, Agent, or Firm—Mason, Fenwick & Lawrence

[57] ABSTRACT

A conventional tractor mounted corn harvester for harvesting closely spaced rows is disclosed comprising four essentially conventional rearwardly facing single row harvester units mounted on a supporting framework carried by the three-point hitch of a conventional tractor and facing rearwardly for use in a harvesting operation in which the tractor moves in a reverse direction; right and left collecting conveyors extend along opposite sides of the engine housing from beneath the rear axle forwardly of the engine for receiving corn from the harvester unit, and carrying same to a trailer towed by the tractor. Another aspect of the invention resides in the use of two variable speed hydraulic motors each employed for driving two of the four auger conveyors of the row harvester units with each motor driving a pair of the auger conveyors being hydraulically in series with drive motors of right and left infeed conveyors for delivering harvested corn from the outboard harvester units onto the collecting conveyors. Hydraulic controls enable adjustment of the speed of the various components with respect to each other for achieving optimum efficiency in accordance with crop conditions.

20 Claims, 8 Drawing Figures

TRACTOR MOUNTED CORN HARVESTER

This invention is in the field of agricultural equipment and is specifically directed to corn harvesting apparatus capable of being mounted on a conventional tractor.

Previously known multi-row corn harvester apparatus capable of being mounted on conventional tractors has practically universally consisted of forwardly facing harvester units extending parallel to the axis of the tractor on opposite sides of the engine housing. Such harvester units can only be spaced together as close as the width of the engine housing will permit and since the engine housing of all tractors is of substantial width, the closest possible prior known spacing for the individual row harvester units has enabled a harvesting of rows spaced 36 inches or more apart. Additionally, such harvester units have necessarily required the employment of long auger conveyors receiving the harvested corn and extending from adjacent the ground upwardly above the axle of the tractor to the rear of the tractor for discharge onto a rearwardly extending elevator which conveys the corn onto a trailer towed behind the tractor. Consequently, the auger conveyors are of substantial length and subject the corn to substantial handling movement which is of particular detriment to the corn when sweetcorn is being harvested.

Greater crop yields and more efficient land and cost efficiency for corn crops can be achieved by the employment of rows more closely spaced than the widely employed 36 inches spacing. Unfortunately, the prior known harvester units capable of use on conventional tractors have not been capable of use with rows more closely spaced than 36 inches and the only way in which more closely spaced rows could be harvested mechanically would be through the employment of a specially designed self-propelled harvester vehicle which would only be usable for the specific purpose of harvesting corn during the short harvesting season. Unfortunately, it is not economically feasible for most farming operations to incur the capital expense of such a harvesting apparatus which must remain idle for ten or eleven months of the year. Therefore, there has been a substantial need for corn harvesting apparatus capable of being removably mounted on a conventional tractor and also capable of being used for harvesting corn in closely spaced rows.

Consequently, it is the primary object of this invention to provide new and improved tractor mounted corn harvester means.

Another object of the invention is the provision of new and improved corn harvester means capable of harvesting corn in closely spaced rows and also capable of being detachably mounted on a conventional tractor.

Achievement of the objects of this invention is enabled through the provision of a supporting framework detachably connectable to the three-point hitch of the rear portion of a conventional tractor. The detachable framework provides support for four rearwardly facing corn harvester units all spaced to the rear of the rear wheels of the tractor and which can be spaced much more closely together than would be the case if the harvester units were facing forwardly on opposite sides of the engine housing in the manner of prior conventional harvesters. The harvester units comprise a left pair of units and a right pair of units which are of generally conventional construction including a rotary auger conveyor having a trough for receiving the corn pulled from the stalk by a pair of cooperating rotary knives which pull the stalks downwardly in a slot so that the corn engages a stop bar from which it is snapped from the stalk to fall into the conveyor trough as the tractor is moved in what would normally be a reverse direction. Transversely oriented relatively short infeed conveyors are provided on opposite sides of the supporting framework beneath the two outermost harvester units for receiving corn therefrom and conveying the corn inwardly toward the center of the apparatus.

By placing the row harvester units on the rear of the tractor, the length of the auger-conveyors of each unit can be reduced to approximately 50 percent of the length of the auger-conveyors of prior conventional harvesters so that the corn is subjected to substantially less handling.

Two length-wise extending relatively horizontal removal conveyors extend beneath the tractor axle inwardly of the rear wheels of the tractor and are each positioned to receive corn from one of the infeed conveyors and from the two innermost row harvester units for subsequent conveying of the corn forwardly onto one of two upwardly extending elevator conveyors which carry the corn upwardly for discharge into a trailing vehicle.

Power for all of the harvester units is provided by the power takeoff of the tractor which drives hydraulic pumps which provide pressurized hydraulic fluid to a pair of auger drive motors. One auger drive motor drives the augers of the left pair of harvester units and another auger drive motor drives the augers of the right pair of harvester units through a chain connecting the shafts of the two auger members. Fluid from the auger drive motors is discharged through the inlet of a relatively small hydraulic motor provided on each of the infeed conveyors. Additionally, the elevator conveyor and the removal conveyors are all hydraulically driven by selectively controlled hydraulic motor means so that the various components can be operated at optimum speed for the particular crop being harvested. Moreover, mechanical drive through chain transmission means from the power takeoff of the tractor drives the gathering chains and trash handling portions of the harvester units.

A better understanding of the subject invention will be enabled when the following detailed written description is read in conjunction with the appended drawings in which:

FIG. 6B is a diagrammatic pictorial illustration of another portion of the mechanical power transmission elements of the preferred embodiment.

Figure 1:
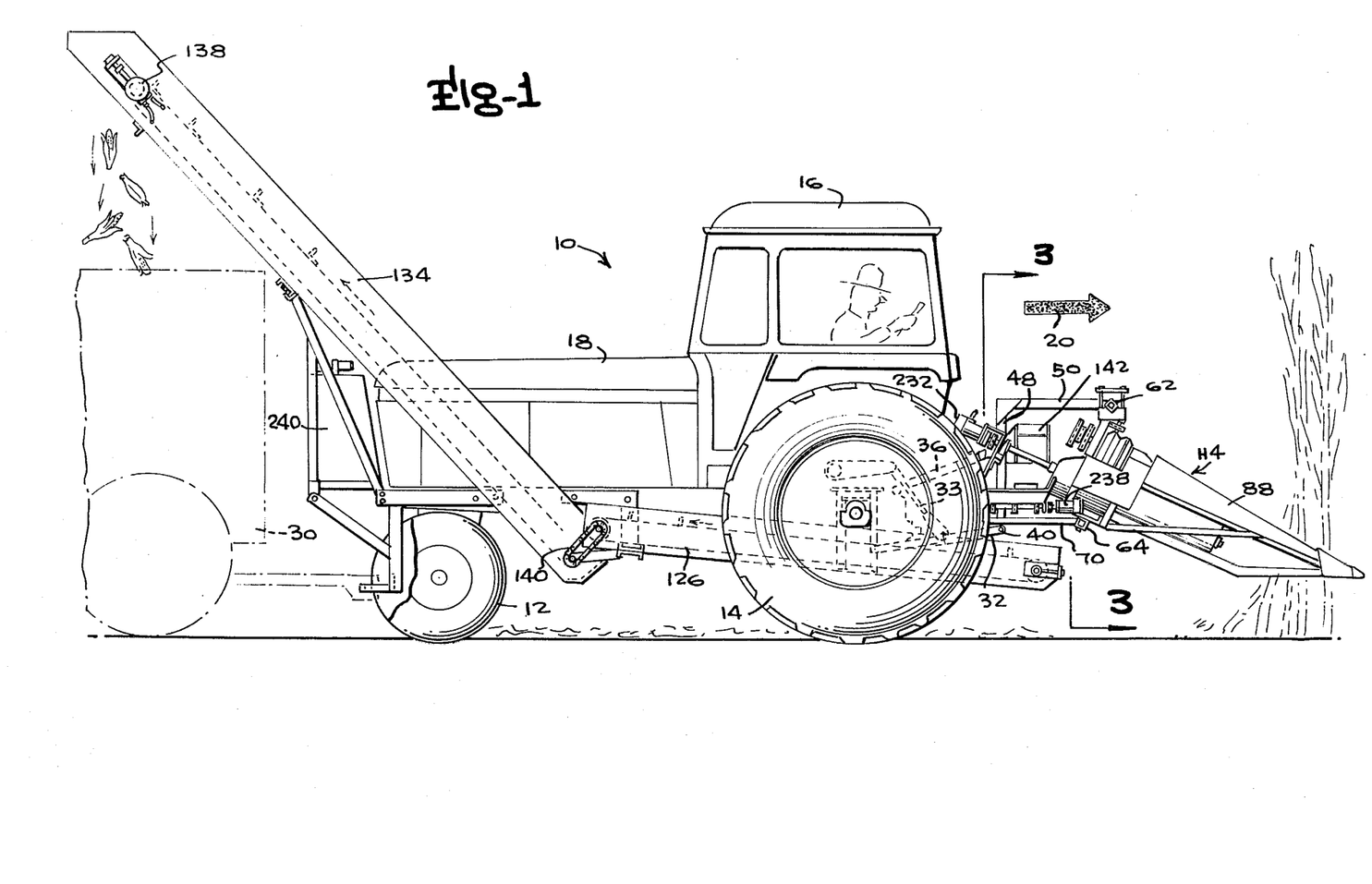
FIG. 1 is a side elevation view of the preferred embodiment of the invention.

Attention is initially invited to FIG. 1 of the drawings which illustrates a conventional tractor 10 having steering wheels 12 of relatively small diameter and main power drive wheels 14 of large size with an operator's cab 16 being positioned over the large drive wheels 14. An engine housing and frame assembly 18 extends from the operator's cab 16 medially of the tractor forwardly over the front wheels 12.

Tractors such as tractor 10 are normally operated with the smaller wheels 12 comprising the front or leading wheels with the vehicle being moved from right to left as illustrated in FIG. 1. However, tractors of this type can be equipped with a reverse steering wheel and other controls in the cab so that the driver faces rearwardly as illustrated in FIG. 1. Such reverse operation of the tractor 10 in the direction of the arrow 20 is illustrated in FIG. 1 and it is in this manner of operation that the tractor 10 is operated during employment of the subject invention.

Therefore, for the sake of clarity, the terms "forward" and "rearward" as employed throughout the following description of the invention are used in the sense that "forward" is in the direction of arrow 20 and "rearward" is in the exact opposite direction.

Figure 2:
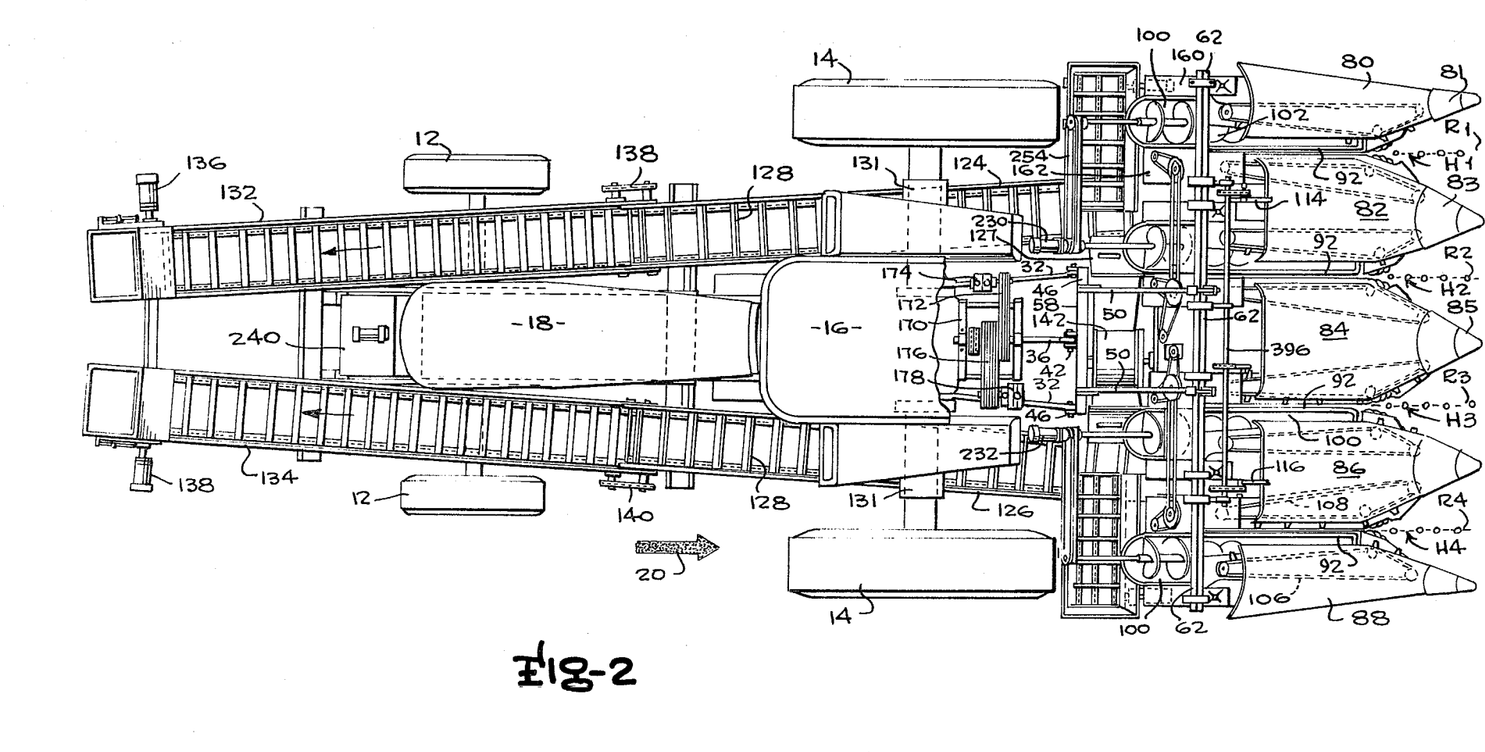
FIG. 2 is a top plan view of the preferred embodiment.

A gang of individual row crop harvester units, comprising a left pair of individual row harvester units H1 and H2 and a right pair of individual corn row harvester units H3 and H4 extends forwardly in front of the operator as shown in FIG. 1. Each of the harvester units H1, H2, H3 and H4 respectively operates to harvest corn from individual rows R1, R2, R3 and R4 as shown in FIG. 2 of the drawings.

Figure 4:
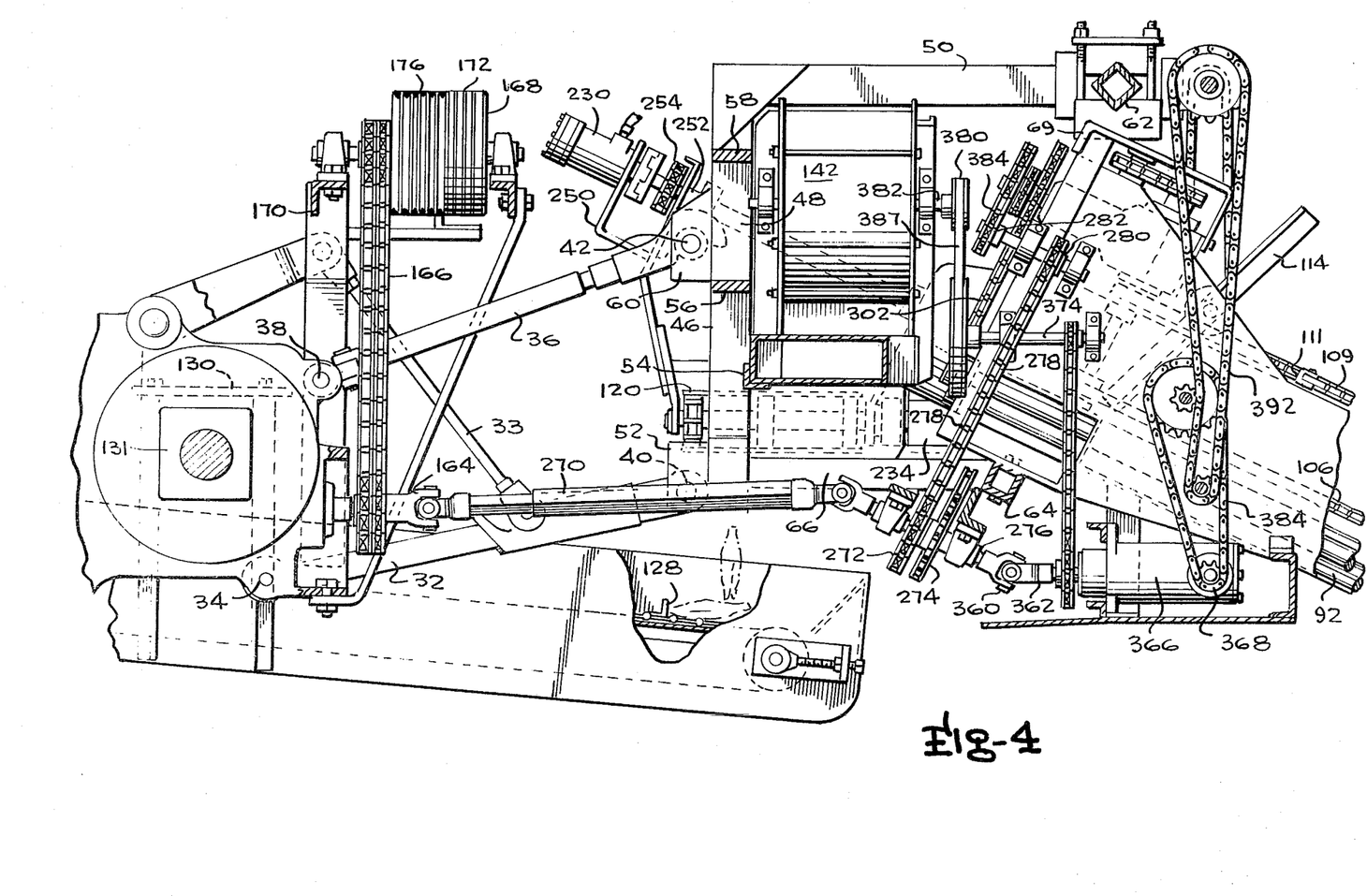
FIG. 4 is a sectional view taken along lines 4—4 of FIG. 3.

Support for the four harvester units is provided by the conventional three-point hitch of the tractor which comprises first and second parallel lower support arms 32 (FIG. 2) pivotally connected to the tractor frame at 34 and a centrally positioned higher coupling link arm 36 pivotally connected to the tractor frame at 38 as best shown in FIG. 4. Lower support arms 32 are connected to hydraulic lift rods 33 which pivotally adjust the position of the support arms about pivot 34 and have their outer ends pivotally connected to lower support pins 40 of a main support frame of the four harvester units and their associated conveyor and drive accessories. The centrally positioned coupling link arm 36 has its outer end connected to a retaining pin 42 fixedly connected to the main frame and having a central ball portion 43 to which the end of arm 36 is connected.

The primary elements of the main support frame include a primary or backbone from which outwardly extending arm-like support elements extend. The primary frame includes two interconnected parallel side plates each formed of a lower vertical section 44, inwardly inclined medial portions 46, vertical top portions 48 and forwardly extending cantilever arm portions 50 as best shown in FIGS. 1–4.

Figure 3:
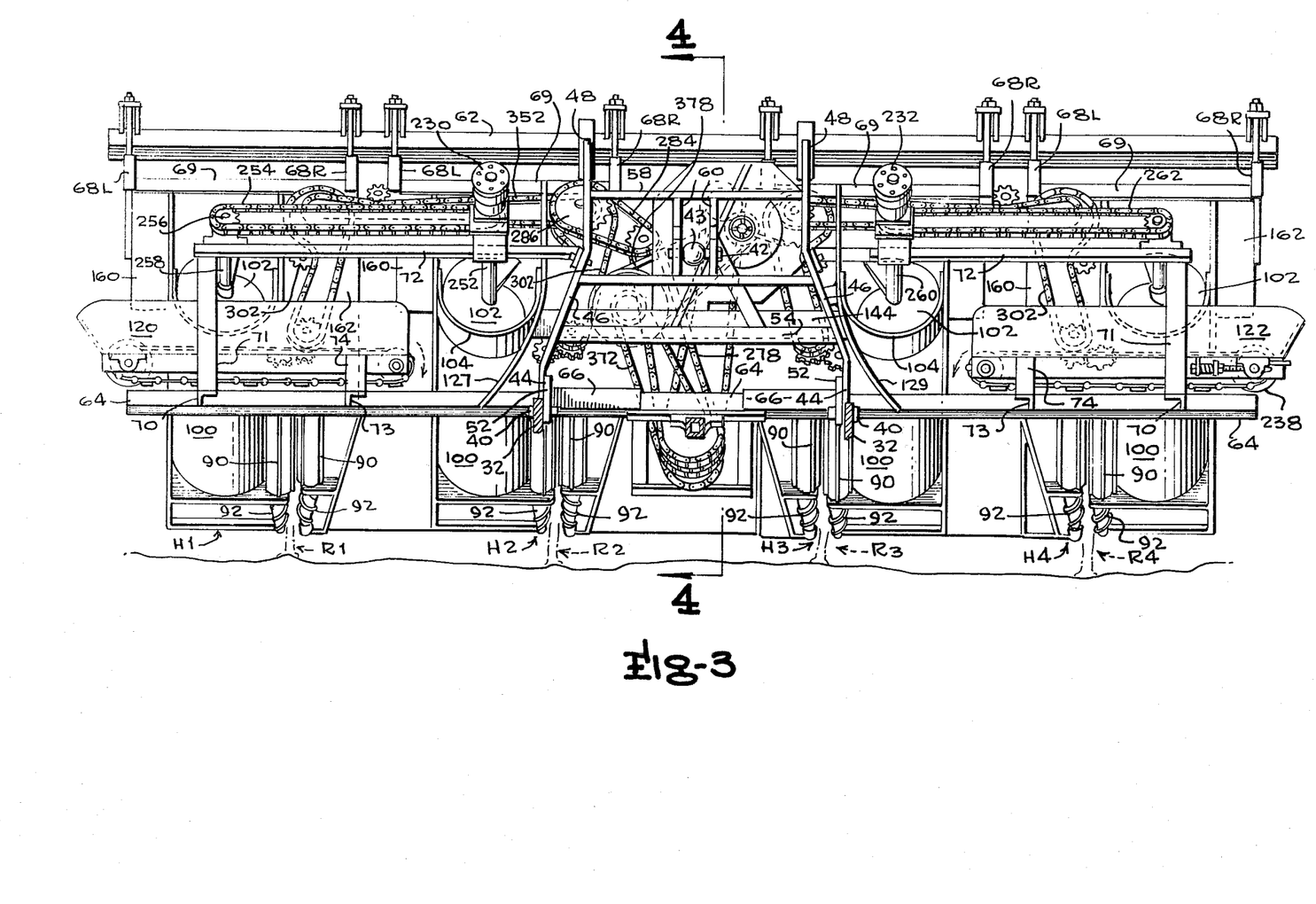
FIG. 3 is a sectional view taken along lines 3—3 of FIG. 1.

It should be noted that rearwardly extending bracket plates 52 (FIGS. 3 & 4) are welded to the lower inside surfaces of the lower vertical sections 44 and provide support for the support pins 40 to which the outer ends of the lower support arms 32 are connected. An angle member 54 and a parallel horizontal brace plate 56 are welded between the inwardly inclined medial frame portions 46 and a horizontal brace plate 58 is welded between the vertical top portions 48 to provide a rigid relationship between the two side arm frame members as will be apparent from inspection of FIG. 3. Additionally, two parallel pin support plates 60 are welded between the plates 56 and 58 and have a forward extension in which the retaining pin 42 is mounted with ball portions 43 being centrally positioned between plates 60 as illustrated in FIG. 3.

The forward ends of the cantilever arm portions 50 support a transversely outwardly extending harvester unit supporting upper support beam 62 (FIG. 4). Additionally, a lower transversely extending support beam 64 is supported on the forward ends of forwardly extending frame components including inwardly canted frame elements 66 and the forward ends of parallel support plates positioned in the same plane as components 44 to which their rearward ends are welded but which are hidden from view in FIG. 3 by components 44.

Each of the harvester units H1, H2 etc. is of generally conventional construction and is supported from the harvester unit support beams 62 and 64 by frame means connected between beams 62 and 64. Each harvester unit is hangingly connected to upper beam 62 by plates comprising a left support bracket plate 68L and a right support bracket plate 68R. Inverted angle piece 69 connects the bracket plates 68L and 68R as illustrated in FIG. 3.

Vertical hanger members 160, 162 extend downwardly from the brackets 68L and 68R and their juncture with the inverted angle piece 69 of each of the individual harvester units and are connected to the lower transverse support beam 64 for supporting the harvester units between beams 62 and 64. A horizontal outside angle brace 70 (FIG. 1) has one end welded to the lower transverse support beam 64 adjacent the right end of beam 64 with its rearward end being connected to a vertically extending outside angle column 71 (FIG. 3) with the upper end of the angle column 71 being connected to a horizontal angle arm 72 having its other end welded to the upper edge of the rightmost inwardly inclined mid-portion 46 as best illustrated in FIG. 3.

Similarly, an internal horizontal angle brace 73 has one end attached to an inward portion of the lower transverse support beam 64 with its opposite end being connected to a relatively short vertical conveyor support post 74.

In like manner, the lefthand side of the transverse lower support beam 64 is provided with an outside horizontal angle brace 70, a vertical angle column 71, a horizontal angle arm 72, an internal horizontal angle brace 73 and a short conveyor support post 74 identical to the previously discussed correspondingly numbered elements provided adjacent the right-hand side of the lower transverse support beam.

Each of the individual corn row harvester units is a modified unit originally manufactured by FMC Corporation and are of generally conventional design. The lefthand harvesting unit H1 includes a lefthand outside cowling 80 covering a portion of the harvester unit with the lefthand outside cowling 80 cooperating with a lefthand inboard cowling 82 covering portions of the harvester unit H1 along with a portion of the harvester unit H2. The cowling 80 is tapered in its forward portion 81 and the cowling 82 has a tapered front portion 83 so that the portions 81 and 83 cooperate to define an inwardly converging slot associated with the row R1 for directing the corn stalks of that row into the harvester H1 as shown in FIG. 2.

A central cowling 84 having a tapered front portion 85 covers portions of the harvester units H2 and H3 with the portions 83 and 85 cooperating to define an inwardly converging area into which the stalks of the row R2 are guided for harvesting by the harvester unit H2. Similarly, a righthand inboard cowling 86 and a righthand outside cowling 88 both having tapered forward portions defining converging feed paths for guiding the stalks of rows R3 and R4 into the harvester units H3 and H4 in an obvious manner.

While each of the individual row harvester units H1 etc. is a modified generally conventional design, it is noted that each row harvester unit includes a pair of rotary knives 90 having radial flanges and lower tapered conical ends 92 (FIG. 3) between which the corn stalks are guided as the apparatus moves forwardly. The upper ends of the rotary knives 90 are more closely spaced together than are the lower ends in each harvester unit so that the space between the rotary knives converges from front to rear. Drive means for the rotary knives rotates the knives so that their inwardly facing nip engages each stalk to pull the stalk downwardly. The downward pull on each stalk results in engagement of the corn ears on the stalk with a snap or stop bar 92 which snaps the ear from the stalk. The ear then falls into a semi-circular conveyor trough 100 positioned beneath the snap or stop bar 92. A rotary driven auger 102 is mounted for rotation in trough 100 so that rotation of auger 102 carries the harvested corn ears upwardly to the upper edge 104 of the conveyor trough 100 from which the corn ears fall onto conveyor means for subsequent conveyance to a trailer in a manner to be discussed hereinafter. Auger 102 and trough 100 are substantially shorter than the augers and troughs of previous harvesters since they do not need to be of a length adequate to convey corn up over the drive axle to the rear of the tractor as is the case with conventional harvester units.

In addition, the feed of the corn stalks into gripping engagement by knives 90 is aided by the inwardly facing flights of two gathering chains 106, 108 and an upper gathering chain 109 provided in each of the individual row harvester units and having feed lugs 111 extending outwardly for engaging the corn stalks. Chains 106, 108 and 109 extend forwardly a greater distance than conventional harvesters and are particularly effective for harvesting corn that has been partially or completely blown over. A pair of cooperating rotary finned stalk ejectors 110 are mounted for driven rotation adjacent the upper end of each of the conveyor troughs 100 and a trash eliminator paddle or beater 114 is mounted for rotation in a vertical plane between the left harvester units H1 and H2 and a right trash removal paddle or beater 116 is mounted for rotation between the right harvester units H3 and H4. The trash removal paddles 114 and 116 are not part of the previously known conventional harvester units and have been found to be of substantial advantage in removing stalk and leaf parts coming from ejectors 110 which previously tended to clog the area immediately downstream the ejectors 110.

A relatively short left infeed conveyor 120 (FIG. 3) is mounted on lefthand angle brace members 70 and 73 below the upper edge of the trough 100 of the left outboard harvester unit H1 so that corn ears falling from the upper edge of the conveyor trough 100 of that harvester unit are deposited on the conveyor 120 and conveyed to the right as shown in FIG. 3. Similarly, a right infeed conveyor 122 is positioned on righthand brace members 70 and 73 beneath the trough 100 of the righthand outboard harvester unit H4 to receive corn ears from the upper edge of the trough 100 to convey same inwardly to the left as viewed in FIG. 3.

The inner or discharge ends of the conveyors 120, 122 are respectively positioned in left and right collecting areas over the upstream end of length-wise extending fixedly mounted left and right removal conveyors 124 and 126 respectively hung from brackets 130 on axle housing 131 (FIG. 4) positioned on opposite sides of the tractor. In addition, the upper edge of the troughs 100 of the interior harvester units H2 and H3 are respectively in vertical alignment with left and right deflector plates 127 and 129 in general alignment with the removal conveyors 124 and 126 so that corn harvested by these harvester units falls onto the deflector plates 127 and 129 from which it is directed into the left and right collecting areas onto conveyors 124 and 126.

Both of the conveyors 124 and 126 are conventional and include a pair of parallel driven chains between which feed flange members 128 extend with movement of the chains being such that the upper flights of the chains move from right to left as viewed in FIGS. 1 and 2 so that corn ears deposited onto the conveyors 124 and 126 are conveyed to the lower end of a left elevator conveyor 132 and a right elevator conveyor 134 respectively. The elevator conveyors 132 and 134 are respectively provided with hydraulic motors 136 and 138 which drive these conveyors as well as their associated removal conveyors 124 and 126 by virtue of chain drive connections 138 and 140 in a manner that will be apparent from inspection of FIGS. 1 and 2. Corn from elevators 132 and 134 is discharged into a trailing cart or other vehicle 30 following closely behind tractor 10 as illustrated in FIG. 1.

A centrifugal blower 142 is connected to a horizontal blower housing duct 144 which discharges an air blast outwardly across the upper ends of the troughs 100 of the two inboard harvester units H2 and H3 and across the lefthand and righthand infeed conveyors 120 and 122 for blowing trash particles in the collecting areas outwardly away from the harvesting apparatus so that the trash particles are separated from the harvested corn.

Power for the various driven components is provided from the power takeoff (PTO) 164 of the tractor and is directly employed for mechanically driving some of the components while others of the components are driven by hydraulic motor means supplied with power fluid from hydraulic pump means driven from the power takeoff.

Figures 5, 6:
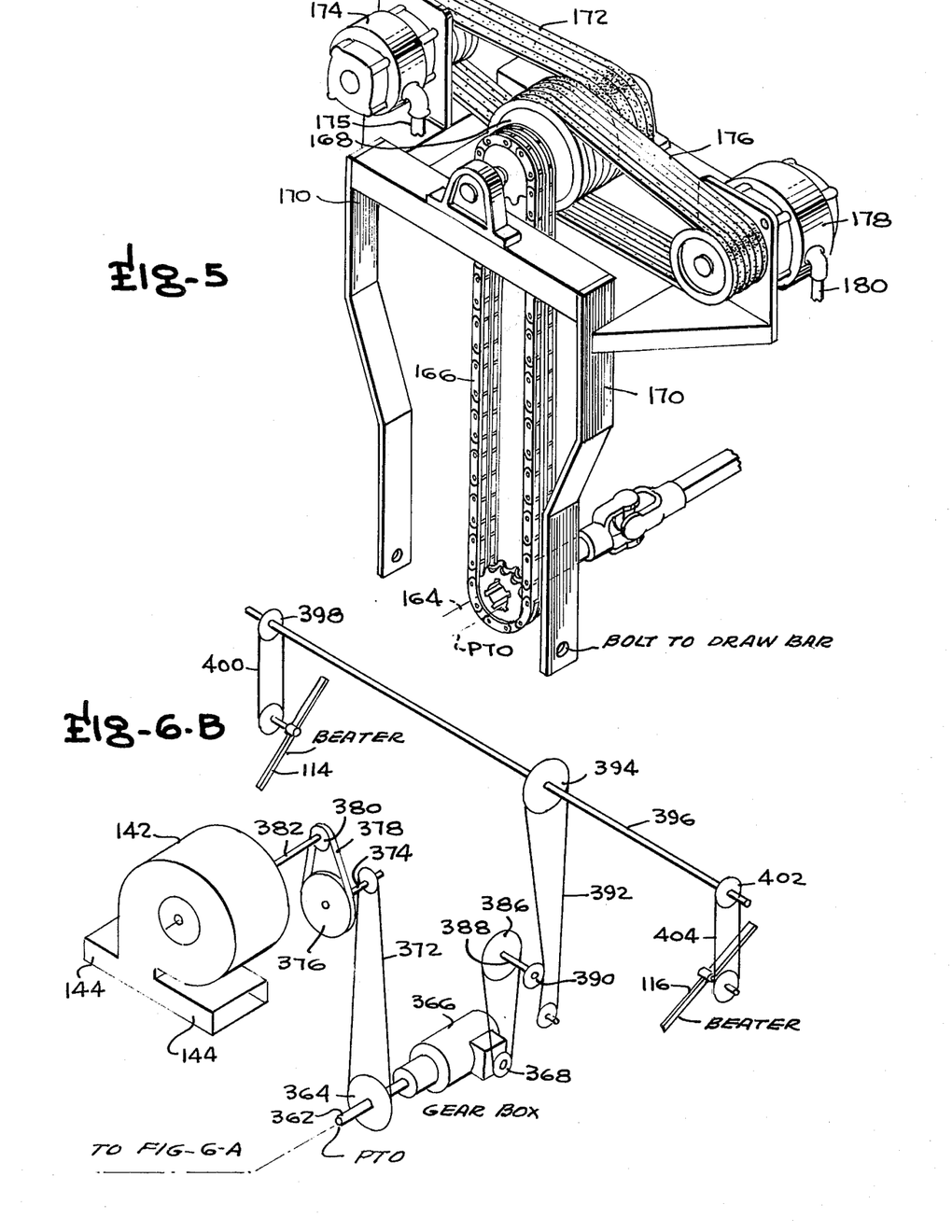
FIG. 5 is a perspective view of a portion of the drive system of the preferred embodiment.
Figure 6A:
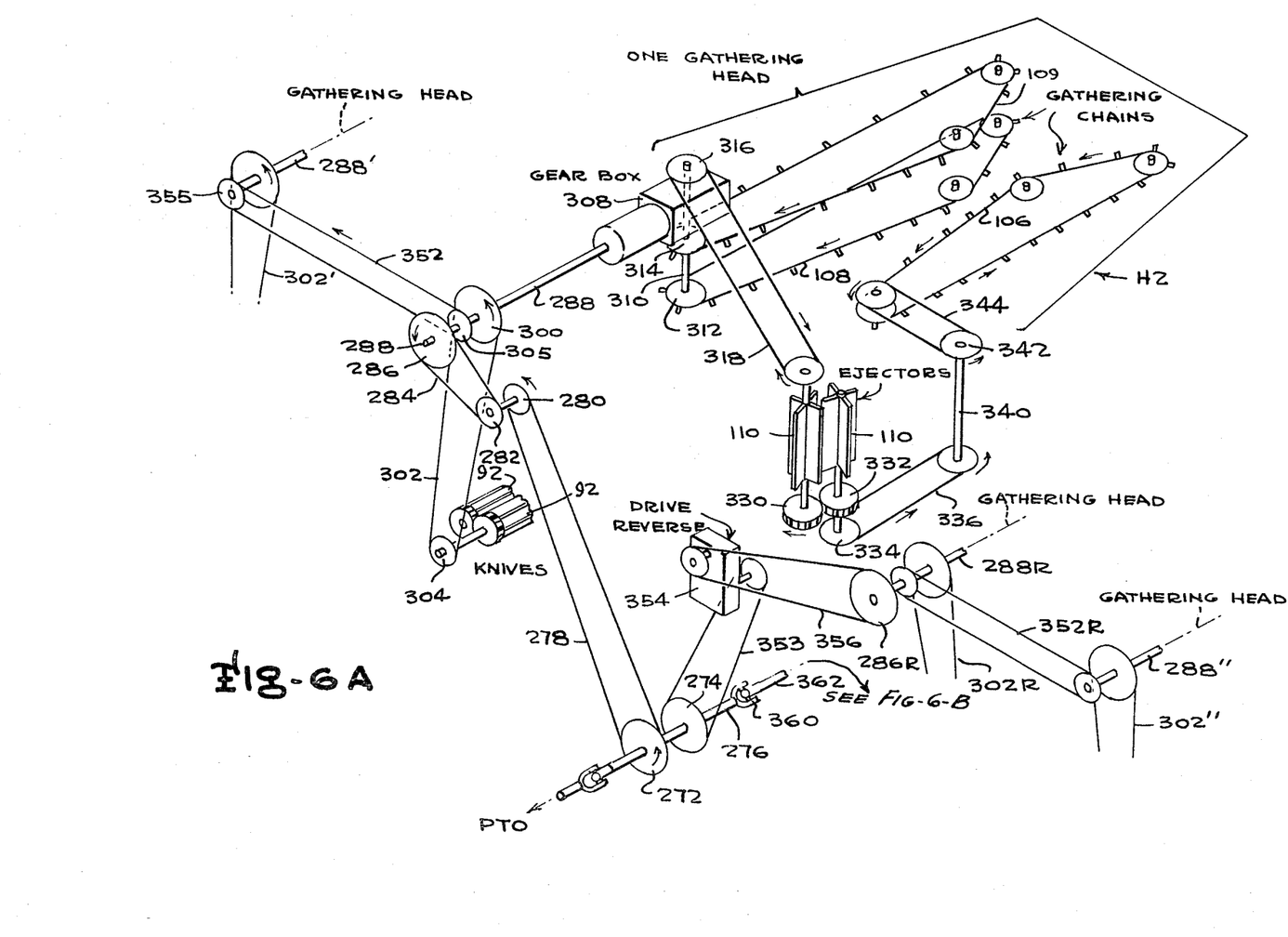
FIG. 6A is a diagrammatic illustration of the mechanical power transmission components of the preferred embodiment.

The hydraulic drive and control system will be initially discussed with attention being invited to FIGS. 4, 5 and 6-A. Power for the hydraulic system comes from the power takeoff 164 of the tractor 10 which is connected by chains 166 to a central driven sprocket 167 coaxially mounted for rotation with a pulley unit 168 on a framework 170 which is supported on the frame and drawbar assembly of the tractor. A first set of belts 172 extends about the pulley 168 and about the power input pulley of a relatively low capacity pump 174 for driving the pump 174 which provides pressurized hydraulic fluid to an outlet line 175. Additionally, a second set of belts 176 connects the drive pulley 168 with a higher capacity pump 178 for driving the pump 178 to provide pressurized hydraulic fluid to an outlet line 180 in an obvious manner as will be apparent from inspection of FIGS. 4 and 5.

Figure 7:
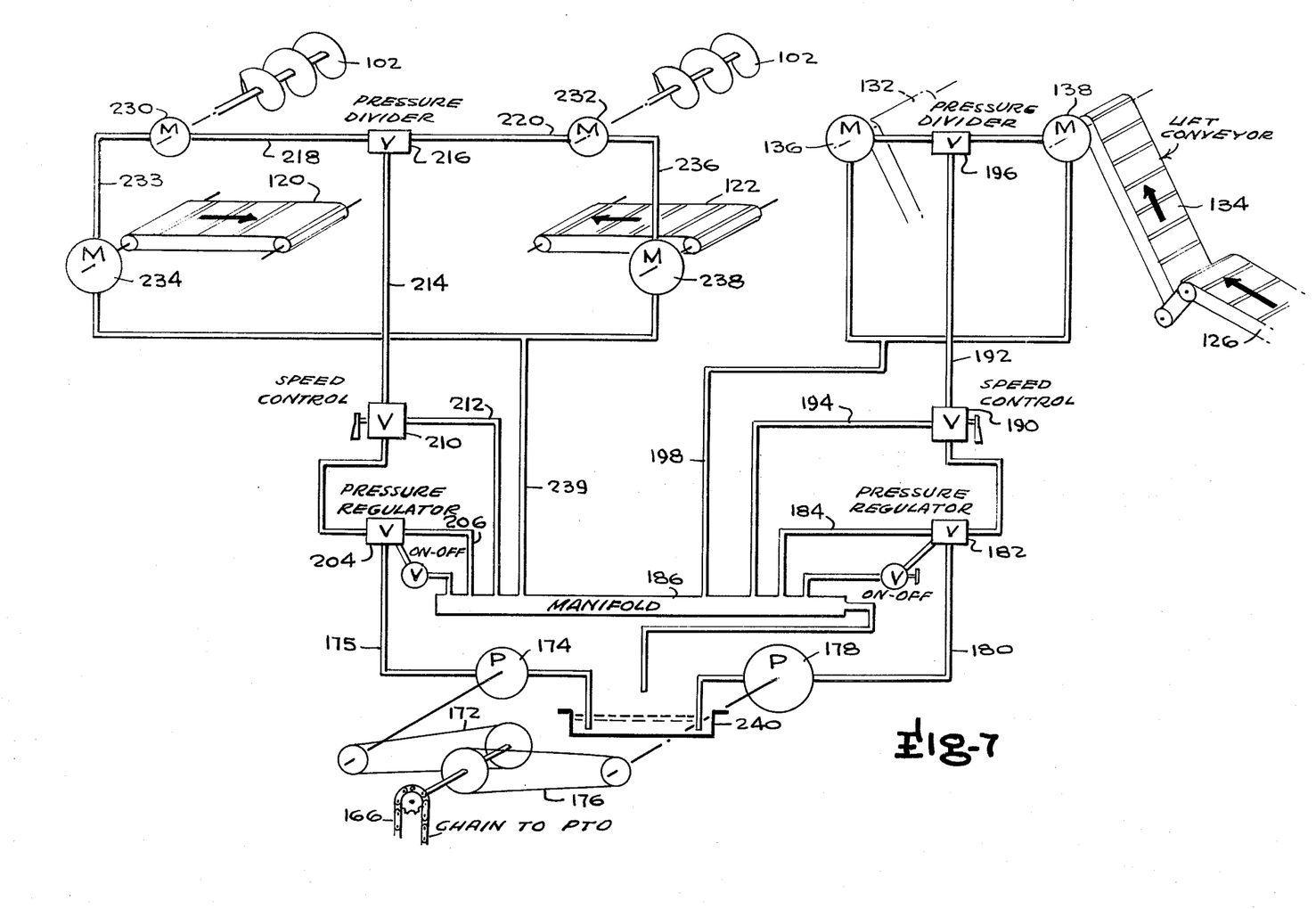
FIG. 7 is a diagrammatic illustration of the hydraulic drive and control components of the preferred embodiment.

Turning now to FIG. 7, it will be seen that the high pressure outlet line 180 from the high capacity pump 178 is connected to a pressure regulator 182 from which a dump line 184 extends to an exhaust manifold 186. Pressure regulator 182 is also connected by a conduit 188 to a conventional speed control valve 190 having an outlet conduit 192 and also having a dump line 194 communicating with the exhaust manifold 186.

Outlet conduit 192 is connected to a pressure divider 196 in which the hydraulic fluid is divided to flow to the inlets of the two relatively large hydraulic motors 136 and 138 mounted on the lift conveyor elevator members 132 and 134 respectively. Operation of the motors 136 and 138 drives the elevators 132 and 134 and their associated removal conveyors 124 and 126 in a manner previously discussed. Exhausted hydraulic fluid from motors 136 and 138 flows into a discharge conduit 198 connected to the exhaust manifold 186. Therefore, it will be seen that manipulation of the speed control valve 190 serves to adjust the speed of operation of the conveyors 132, 134, 124 and 126.

Smaller pump 174 is connected by outlet line 175 to a pressure regulator 204 having a dump line 206 connected to manifold 186 and having an outlet line 208 connected to a speed control valve 210. Speed control valve 210 has a dump line 212 connected to the manifold 186 and a conduit 214 connected to a pressure divider 216 from which the divided hydraulic fluid flows through a conduit 218 and a conduit 220. Conduit 218 is connected to a left auger drive motor 230 which drives the augers 102 of the two left harvester units H1 and H2 in a manner to be more particularly discussed hereinafter.

In like manner, conduit 220 is connected to a right auger drive motor 232 which drives the augers 102 of the righthand harvester units H3 and H4.

A conduit 233 extends between the outlet port of motor 230 and an inlet port of a conveyor drive motor 234 drivingly connected to the lefthand infeed conveyor 120. Similarly, a conduit 236 extends between the exhaust port of the motor 232 and an inlet on a conveyor drive motor 238 drivingly connected to the righthand infeed conveyor 122. Hydraulic fluid exhausted from the motors 234 and 238 flows into an exhaust line 239 from which it flows to the manifold 186 which returns all of the exhaust fluid to a reservoir 240 in an obvious manner. The inlet lines of the pump 174 and 178 are connected to the reservoir 240 mounted on the rear of the tractor as illustrated in FIG. 1 so that a closed hydraulic system is provided for each of the pumps and the motors driven by each of the pumps.

Left auger drive motor 230 is supported on a bracket 250 (FIG. 4) and is keyed to an extension 252 (FIG. 3) of the auger shaft of the auger in harvester unit H2. A chain 254 extends from a sprocket on the outlet of motor 230 to a sprocket 256 mounted on an extension 258 of the auger shaft of the auger 102 of the harvester unit H1 for driving the auger of that harvester unit in an obvious manner.

In like manner, the righthand auger drive motor 232 is drivingly connected to an extension 260 of the auger shaft of the inboard harvester unit H3 and drives the auger of the outboard harvester unit H4 by means of a chain 262 etc. as best illustrated in FIG. 3.

The drive to the mechanically driven components will now be discussed with it being initially noted that the power takeoff 164 is connected through two universal joints on the ends of a telescopic drive shaft 270 (FIG. 4) to coaxial output sprockets 272 and 274 on a shaft 276. Sprocket 272 is connected by a chain 278 to a sprocket 280 which is, in turn, keyed to a shaft 281 along with a sprocket 282 from which a chain 284 extends to a sprocket 286 keyed on a shaft 288.

Shaft 288 supports a knife drive sprocket 300 from which a chain 302 extends to a power input sprocket 304 mounted on a shaft 306 of one of the rotary knives 92 of the inboard lefthand harvester unit H2 which is the only unit having its drive components illustrated completely in FIG. 6-A. Shaft 288 is connected to a gear box 308 having an output shaft 310 extending from opposite sides of its housing. Sprockets 312, 314 and 316 are keyed to shaft 310. Sprockets 312 and 314 are drivingly connected to the gathering chains 108 and 109 for driving same in the direction of the arrows in FIG. 6A and sprocket 316 is drivingly connected to a chain 318 for driving the ejector rollers 110 in an obvious manner. It is to be noted that the rollers 110 are connected by spur gears 330, 332 to rotate in unison and a sprocket 334 mounted on the shaft of one of the ejector rollers 110 is connected by a chain 336, sprocket 338, idler shaft 340, sprocket 342 and chain 344 to drive the gathering chain 106.

All mechanical drive power for the harvester unit H1 is provided by a chain 352 extending from sprocket 305 which drives a sprocket 353 keyed to a shaft 288'. Shaft 288' is analagous to shaft 288 and serves to drive the chain and ejector rollers of the harvester unit H1 in the same manner as shaft 288 drives the chains etc. of the harvester unit H2. Moreover, a chain 302' drives the cutter knives 92 of the harvester unit H1 in the same manner as chain 302 provides drive to the cutter knives 92 of the unit H3.

The harvester units of the right bank of harvester units comprising units H3 and H4 are driven by a chain 353 drivingly connected to a reversing transmission 354 having an output to a chain 356. Chain 356 drives a sprocket 286 R keyed to a shaft 288 R corresponding to shaft 288 which shaft in turn drives the chains of the inboard right harvester unit H3 with a chain 302 R driving the injector rollers in the same manner as the rollers 110 of the unit H2 as preciously discussed. Similarly, a chain 352 R provides mechanical power to the main drive shaft 288" of the harvester unit H4 which drives the components of unit H4 in the same manner as shaft 288 drives the components of harvester unit H2.

Power for driving the blower 142 and the trash removing paddles 114 and 116 is provided by drive means just illustrated in FIG. 6B. The drive power is provided from the power takeoff power directed to shaft 276 as previously discussed with shaft 276 being connected through a universal joint 360 (FIG. 4) to drive a shaft 362 to which a sprocket 364 is keyed. Shaft 362 is also drivingly connected to a gear box 366 having an output sprocket 368. Drive to the fan 142 includes a chain 372 driving a shaft 374 to which a belt pulley 376 is keyed with a belt 378 extending about pulley 376 and an input pulley 380 on the shaft 382 of the fan 142 as best illustrated in FIG. 6B.

Drive for the trash removing paddles 114 and 116 includes a chain 384 connected to the output sprocket 368 and to a sprocket 386 mounted on a shaft 388. A smaller sprocket 390 is keyed to shaft 388 and is drivingly engaged with a drive chain 392. Chain 392 extends about a driven sprocket 394 keyed to a shaft 396. A sprocket 398 on the left end of shaft 396 drives a chain 400 which in turn drives the lefthand trash removing paddle 114 in an obvious manner. Similarly, a sprocket 402 in conjunction with a chain 404 serves to drive the righthand trash removing paddle 116 in the same manner.

Turning now to FIG. 2, it should be appreciated that the subject invention enables the individual row harvester units to be more closely spaced together than would be the case if the harvester units were facing in an opposite direction with the two interior harvester units H2 and H3 bracketed on opposite sides of the engine housing frame assembly 18 due to the substantial width of the housing assembly 18. Consequently, the harvester units can be positioned to harvest corn in 30 inch or less rows are opposed to prior known tractor mounted harvesters positioned on opposite sides of the engine housing which cannot be more closely spaced than 36 inches due to the housing width. Moreover, the individual row harvester units of the present invention could be even more closely positioned by making their attachments adjustable on the supporting shafts and by the employment of splined drive connectors for connecting the elements driven by shafts such as shaft 396.

Therefore, it will be seen that the subject invention provides an attachable corn harvester capable of being mounted on a conventional tractor but having the ability of harvesting much more closely spaced rows than has been the case with previous harvester units attachably mounted on conventional tractors.

While numerous modifications of the subject invention will undoubtedly occur to those of skill in the art, it should be understood that the spirit and scope of the invention is to be limited solely in light of the appended claims.

I claim:

1. A corn harvester assembly for use on a conventional tractor being driven rearwardly with respect to its normal direction of movement and having steering wheels on one end of an engine housing, a transverse drive wheel axle housing adjacent the other end of said engine housing, a power takeoff shaft and hitch means adjacent said drive wheel axle housing at the rear portion of the tractor during its normal direction of movement, said harvester assembly comprising a supporting frame, connector means on said supporting frame dimensioned and structured for enabling connection of said supporting frame to said hitch means to be supported by said hitch means, a plurality of individual row corn harvester units mounted on said supporting frame and facing rearwardly with respect to the normal direction of operation of said tractor when said supporting frame is mounted on said hitch and power transmission means positioned to be connectable to said power takeoff shaft for providing driving power to said corn row harvester units when said supporting frame is mounted on said hitch whereby said harvester assembly can be employed for harvesting closely spaced corn rows when said tractor is operated in a direction of movement opposite its normal forward direction of movement.

2. The invention of claim 1 additionally including collecting conveyor means connectable to said tractor for receiving corn from said harvester units in a receiving area adjacent said corn harvester units for conveying said corn to a elevated discharge position trailing the direction of movement of said tractor during a corn harvesting operation so that harvested corn can be deposited in a trailing vehicle.

3. The invention of claim 1 additionally including collecting conveyor means connectable to said tractor for receiving corn from said harvester units in a receiving area adjacent said corn harvester units for conveying harvested corn to an elevated discharge position trailing the tractor during a corn harvesting operation so that harvested corn can be deposited on a trailing vehicle, each corn harvester unit including an inclined auger-trough conveyor having an upper discharge end positioned to discharge harvested corn onto said collecting conveyor means and variable speed hydraulic auger drive motor means for rotatably driving the auger of said inclined auger-trough conveyor means.

4. The invention of claim 3 wherein said corn harvester units comprise a left outboard single row harvester unit, a left inboard single row harvester unit, a right inboard single row harvester unit and a right outboard single row harvester unit.

5. The invention of claim 4 wherein said collecting conveyor means includes a horizontal left infeed conveyor positioned beneath the upper discharge end of said auger-trough conveyor of the left outboard harvester unit for receiving corn therefrom and feeding said corn inwardly toward the centerline of said tractor into a left collecting area positioned beneath the upper end of the auger-trough conveyor of the left inboard harvester unit, a left front to rear extending removal conveyor mounted beneath the drive axle housing of said tractor for receiving corn from said left infeed conveyor and said left inboard harvester unit and conveying said corn to a downstream end in a position alongside and beneath said engine housing, left elevator conveyor means extending upwardly alongside said engine housing and having a lower infeed end positioned beneath the downstream end of said left removal conveyor for receiving corn therefrom and conveying said corn to an upper discharge end defining said discharge position.

6. The invention of claim 5 wherein said collecting conveyor means additionally includes a horizontal right infeed conveyor having one end positioned beneath the upper discharge end of said right outboard harvester unit for receiving corn therefrom and feeding said corn inwardly toward the centerline of said tractor into a right collecting area positioned beneath the discharge end of the auger-trough conveyor of the right inboard harvester unit, a right front to rear extending removal conveyor mounted beneath the drive axle housing of said tractor for receiving corn from said right collecting area and conveying said corn to a downstream end in a position alongside and beneath said engine housing, elevator conveyor means extending upwardly alongside said engine housing and having a lower infeed end positioned beneath the downstream end of said right removal conveyor for receiving corn therefrom and conveying said corn to an upper discharge end defining said discharge position.

7. The invention of claim 6 additionally including blower means having first and second discharge openings respectively for directing an air blast into said left and right collecting areas for blowing trash from said collecting areas.

8. The invention of claim 7 additionally including a left rotatably mounted trash removing paddle means mounted between said left outboard harvester unit and said left inboard harvester unit and a right rotatably mounted trash removing paddle means mounted between said right outboard harvester unit and said right inboard harvester unit and wherein said power transmission means includes mechanical means connectable to the power takeoff of said tractor for drivingly rotating said left and right trash removing paddle means.

9. The invention of claim 6 additionally including a left conveyor drive hydraulic motor means drivingly connected to said left removal conveyor and said left elevator conveyor to drive said left removal conveyor and said left elevator conveyor in unison.

10. The invention of claim 9 additionally including a right conveyor drive hydraulic motor means drivingly connected to said right removal conveyor and said right elevator conveyor to drive said right removal conveyor and said right elevator conveyor in unison.

11. The invention of claim 10 wherein said power transmission means includes a high capacity hydraulic pump means having a high pressure outlet, support means mounting said hydraulic pump means on said tractor frame, power coupling means connecting said power takeoff of said tractor to said hydraulic pump means, power conduit means connecting the high pressure outlet of said hydraulic pump means to said left conveyor drive hydraulic motor, and to said right conveyor drive hydraulic motor and speed control valve means in said power conduit for adjusting the amount of fluid flowing through said conduit to adjust the speed of operation of said left removal conveyor, said left elevator conveyor, said right removal conveyor and said right elevator conveyor in unison.

12. The invention of claim 11 wherein said auger drive motor means includes a left auger drive hydraulic motor drivingly connected to the augers of said left outboard and left inboard harvester units and a right auger drive hydraulic motor drivingly connected to the augers of said right outboard and right inboard harvester units.

13. The invention of claim 12 additionally including a lower capacity hydraulic pump drivingly connected to said power takeoff and supported on said tractor frame and having a high pressure outlet, conduit means connecting said high pressure outlet to said left hydraulic auger drive motor and said right auger drive motor and valve means in said last-mentioned conduit means for varying the speed of operation of said right and left auger drive motors in unison.

14. The invention of claim 13 additionally including a left infeed conveyor drive hydraulic motor drivingly connected to said left infeed conveyor and power supplying conduit means connecting said left infeed hydraulic conveyor drive motor to the exhaust outlet of said left auger drive motor for providing hydraulic drive power for said left infeed conveyor drive motor, a right infeed conveyor drive hydraulic motor drivingly connected to the right infeed conveyor and power supplying conduit means connecting said right infeed conveyor hydraulic drive motor to the exhaust outlet of said right auger drive motor for providing hydraulic power to said right infeed conveyor drive hydraulic motor.

15. The invention of claim 1 wherein said hitch means comprises a three-point hitch on said tractor including two parallel lower support arms and a central coupling link arm positioned above and between said two parallel lower support arms, said two parallel lower support arms and said central coupling link arm all being pivotally connected to said tractor and said connector means comprising first and second aligned support pins positioned on said frame to be connected to the ends of said two parallel lower support arms and a central retaining pin positioned on said frame above and between said first and second aligned support pins to be connected to said central coupling link arm, wherein said corn harvester units include a left outboard single row harvester unit, a left inboard single row harvester unit, a right inboard single row harvester unit and a right outboard single row harvester unit and wherein each of said harvester units includes a power driven inclined auger-trough conveyor having a rearward upper discharge end from which harvested corn from each harvester unit is discharged.

16. The invention of claim 1 wherein said hitch means comprises a three-point hitch on said tractor including two parallel lower support arms and a central coupling link arm positioned above and between said two parallel lower support arms, said two parallel lower support arms and said central coupling link arm all being pivotally connected to said tractor and said connector means comprising first and second aligned support pins positioned on said frame to be connected to the ends of said two parallel lower support arms and a central retaining pin positioned on said frame above and between said first and second aligned support pins to be connected to said central coupling link arm, wherein said corn harvester units include a left outboard single row harvester unit, a left inboard single row harvester unit, a right inboard single row harvester unit and a right outboard single row harvester unit each of said harvester units including a power driven inclined auger-trough conveyor having a rearward upper discharge end from which harvested corn from each harvester unit is discharged and including collecting conveyor means for receiving corn from said harvester units in a receiving area adjacent said harvester units for conveying corn from said harvester units to an elevated discharge position trailing the tractor during a corn harvesting operation for depositing harvested corn in a trailing vehicle.

17. The invention of claim 16 wherein said collecting conveyor means includes right and left elevator conveyor means respectively extending upwardly alongside said opposite sides of said engine housing having an infeed end beneath and adjacent said engine housing and having an upper discharge end above and lengthwise spaced from said engine housing defining said discharge position, a horizontal left infeed conveyor mounted on said frame in a position to receive corn from the upper discharge end of said auger-trough conveyor of said left outboard harvester unit and a right horizontal infeed conveyor mounted on said frame in a position to receive corn from the upper discharge end of said right outboard harvester unit, said power transmission including two hydraulic motors for driving said right infeed conveyor and said left infeed conveyor to move corn on said conveyors to right and left inward discharge locations at which corn on said infeed conveyors is discharged, right and left front to rear extending removal conveyors having upstream ends respectively in said right and left inward discharge locations extending beneath the drive axle housing of said tractor for conveying corn lengthwise of said tractor to the infeed ends of said right and left elevator conveyors.

18. The invention of claim 16 wherein said collecting conveyor means includes right and left elevator conveyor means respectively extending upwardly alongside said opposite sides of said engine housing having an infeed end beneath and adjacent said engine housing and having an upper discharge end above and lengthwise spaced from said engine housing defining said discharge position, a horizontal left infeed conveyor mounted on said frame in a position to receive corn from the upper discharge end of said auger-trough conveyor of said left outboard harvester unit and a right horizontal infeed conveyor mounted on said frame in a position to receive corn from the upper discharge end of said right outboard harvester unit, said power transmission means including hydraulic pump means connected to hydraulic motors for driving said right infeed conveyor and said left infeed conveyor to move corn on said conveyors to right and left inward discharge locations at which corn on said infeed conveyors is discharged, right and left fron to rear extending removal conveyors having upstream ends respectively in said right and left inward discharge locations extending beneath the drive axle housing of said tractor for conveying corn lengthwise of said tractor to the infeed ends of said right and left elevator conveyors, hydraulic motor means drivingly connected to said right removal conveyor and said right elevator conveyor for driving said right removal conveyor and said right elevator conveyor in unison, further hydraulic motor means connected to said left removal conveyor and said left elevator conveyor for driving said left removal conveyor and said left elevator conveyor in unison.

19. The invention of claim 18 additionally including blower means having first and second discharge openings respectively for directing air blasts onto said left and right horizontal infeed conveyors for blowing trash from said infeed conveyors.

20. The invention of claim 19 additionally including a left rotatably mounted trash removing paddle means mounted between said left outboard harvester unit and said left inboard harvester unit and a right rotatably mounted trash removing paddle means mounted between said right outboard harvester unit and said right inboard harvester unit and mechanical drive means forming part of said power transmission means for rotating said left and right trash removing paddle means.

* * * * *

UNITED STATES PATENT OFFICE
CERTIFICATE OF CORRECTION

Patent No. 3,885,375    Dated May 27, 1975

Inventor(s) Ward W. Solterbeck

It is certified that error appears in the above-identified patent and that said Letters Patent are hereby corrected as shown below:

The frontal page of the patent is amended to show the address of the assignee, American Fine Foods, Inc. as Payette, Idaho.

Signed and Sealed this fifth Day of August 1975

[SEAL]

Attest:

RUTH C. MASON
Attesting Officer

C. MARSHALL DANN
Commissioner of Patents and Trademarks